United States Patent [19]
Daems et al.

[11] Patent Number: 5,751,882
[45] Date of Patent: May 12, 1998

[54] OPTICAL FIBRE ORGANIZER

[75] Inventors: Daniel Daems, Berchem; Luk Macken, Kessen-Lo, both of Belgium

[73] Assignee: N.V. Raychem S.A., Kessel-Lo, Belgium

[21] Appl. No.: 532,730

[22] PCT Filed: Mar. 23, 1994

[86] PCT No.: PCT/GB94/00594

§ 371 Date: Sep. 28, 1995

§ 102(e) Date: Sep. 28, 1995

[87] PCT Pub. No.: WO94/23324

PCT Pub. Date: Oct. 13, 1994

[30] Foreign Application Priority Data

Apr. 1, 1993 [GB] United Kingdom .............. 9306854

[51] Int. Cl.$^6$ ............................................. G02B 6/36
[52] U.S. Cl. .................................................. 385/135
[58] Field of Search ............................... 385/134, 135

[56] References Cited

U.S. PATENT DOCUMENTS

| | | | |
|---|---|---|---|
| 4,373,776 | 2/1983 | Purdy | 350/96.2 |
| 4,595,255 | 6/1986 | Bhatt et al. | 350/96.2 |
| 4,737,010 | 4/1988 | Le Maitre et al. | 385/134 |
| 4,840,449 | 6/1989 | Ghandeharizadeh | 385/135 |
| 4,886,336 | 12/1989 | Deusser et al. | 385/135 |
| 4,911,521 | 3/1990 | Ryuto et al. | 385/135 |
| 5,588,076 | 12/1996 | Peacock et al. | 385/135 |

FOREIGN PATENT DOCUMENTS

| | | |
|---|---|---|
| A0 115 725 | 8/1984 | European Pat. Off. . |
| A 0 428 931 | 5/1991 | European Pat. Off. . |
| 2515466 | 4/1983 | France . |
| 2559916 | 8/1985 | France . |
| 2 25 674 | 6/1990 | United Kingdom ............ H02G 3/00 |

OTHER PUBLICATIONS

Patent Abstracts of Japan vol. 8, No. 219 (P-306) (1656) 5 Oct. 1984 & JP.A.59 102 208 (N.D.D.K.) 13 Jun. 1984.

Primary Examiner—John D. Lee
Assistant Examiner—Ellen E. Kang
Attorney, Agent, or Firm—Herbert G. Burkard

[57] ABSTRACT

An optical fibre organizer having a plurality of substantially mutually adjacent inlet ports and a plurality of mutually separated outlet ports, and means connecting the inlet ports and the outlet ports such that a fibre inserted into each inlet port will emerge from a pre-determined outlet port.

15 Claims, 9 Drawing Sheets

Fig.1 (Prior Art)
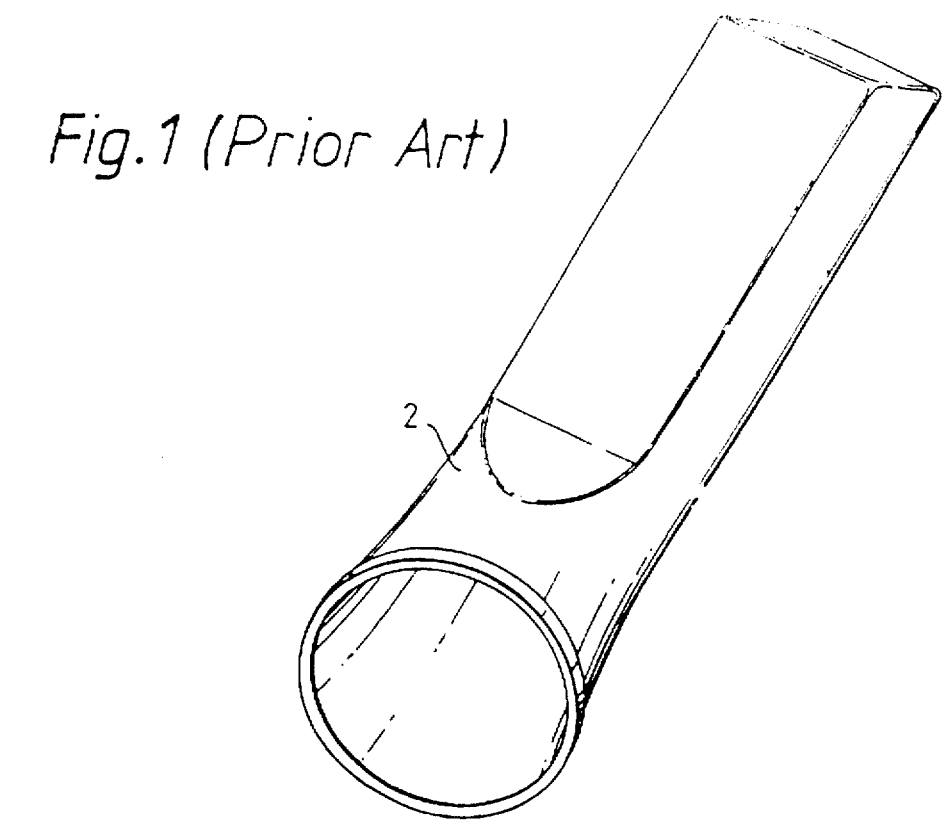
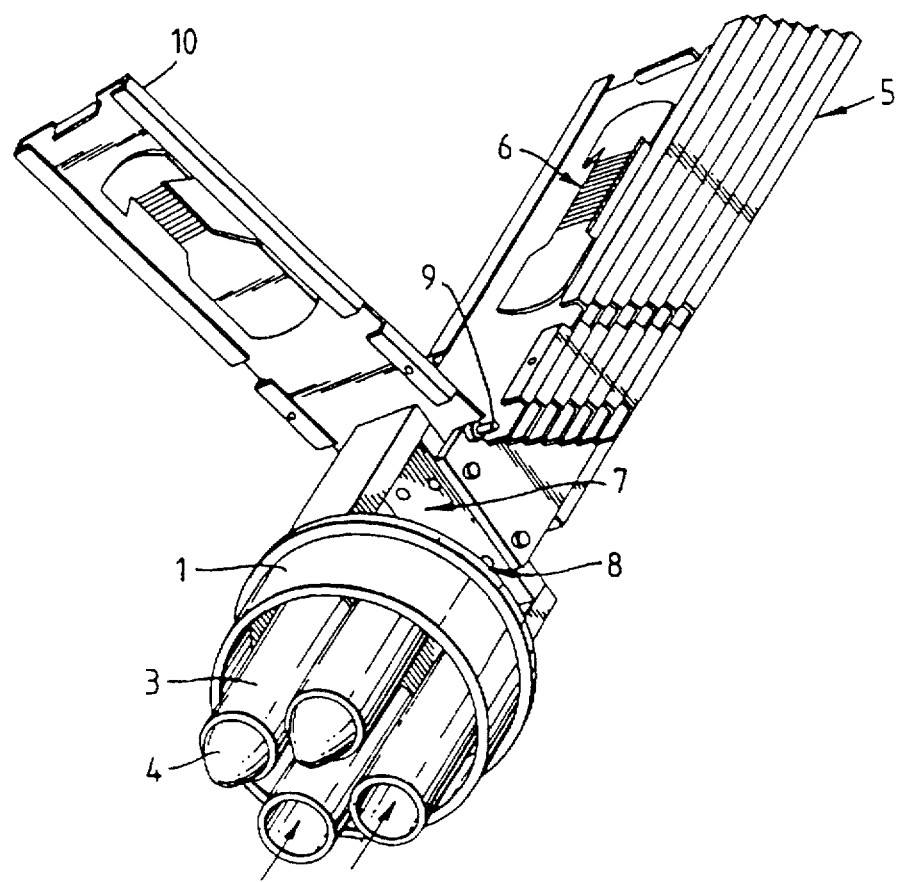

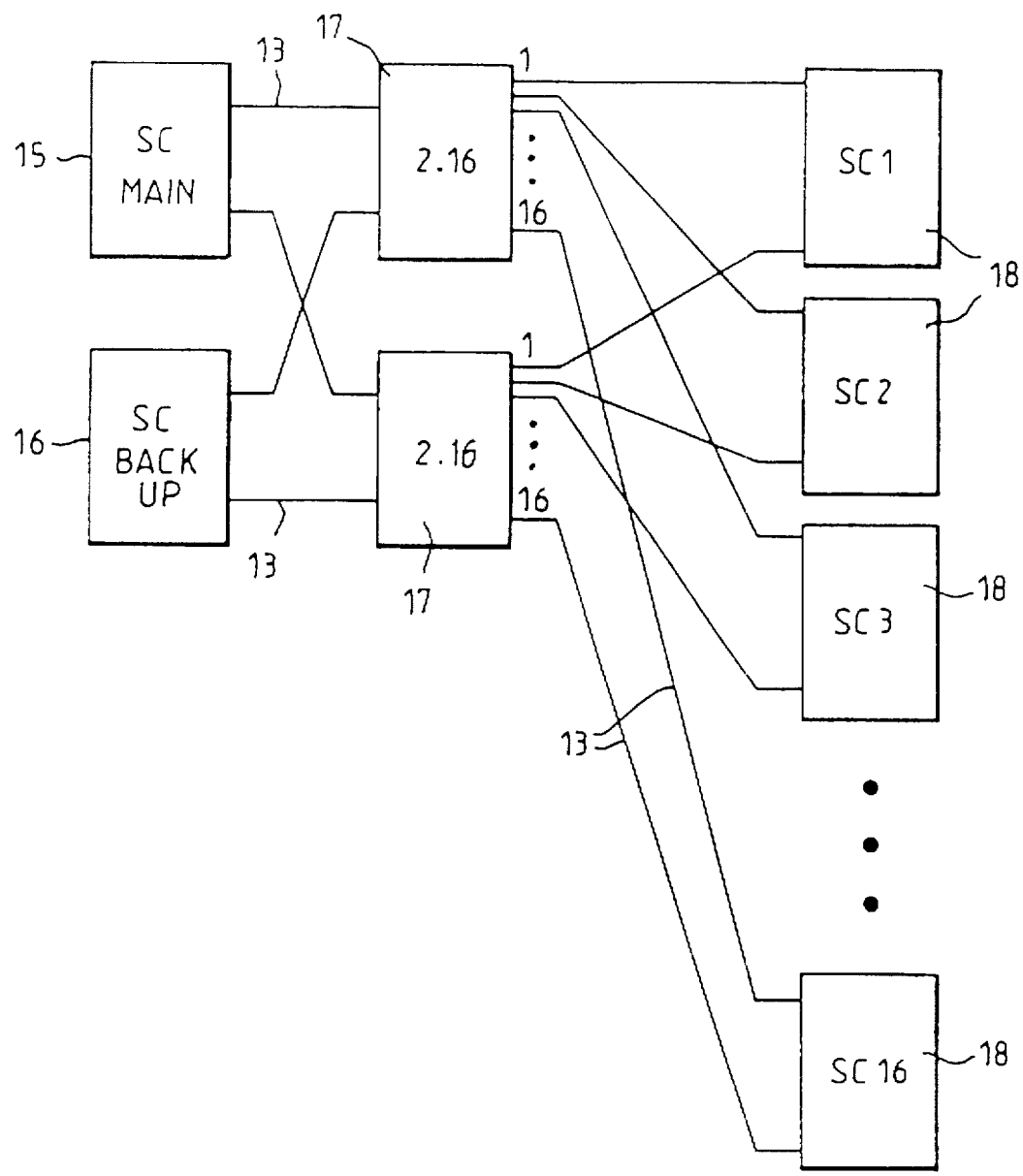

OPTICAL FIBRE ORGANIZER

BACKGROUND OF THE INVENTION

This invention relates to an organizer for optical fibres or other conductors, particularly for use in a telecommunications network.

Optical fibre organizers are required wherever fibres are to be joined or to be stored outside of the protective jacket of a cable. Care must be taken when storing lengths of optical fibre since a bend in a fibre at a radius smaller than its critical bend radius will cause light to be lost from the fibre, and consequential degradation of the signal to be transmitted. Wherever optical fibres are to be spliced together it will be necessary for a length of free fibre to be stored because the operation of fibre splicing will in general need to be carried out away from the cables whose component fibres are being spliced. This is because bulky equipment is needed for the fibre alignment and splicing processes. Thus, where two optical fibre cables are to be spliced a splice closure will be provided having the following features. A cable will enter the closure through a cable entry port and be mechanically secured and generally environmentally sealed. The cable jacket will terminate at the inlet port leaving long lengths of largely unprotected fibre. Each of these fibres will then be spliced to a similar length of unprotected fibre leaving another cable which leaves the splice closure through an exit port. Each spliced fibre will then be coiled at a radius of curvature greater than its critical radius and the coils will be stored on organizer trays. In some fibre architectures incoming fibre carrying many signals will be split into several outgoing fibres, and each outgoing fibre may be coiled on its own organizer tray where it is spliced to an appropriate outgoing fibre.

The nature of the closure which protects the fibre splices and organizers will depend on where the closure is to be situated. If it is to be situated outside a building an environmentally sealed closure will be required, and where it is situated within a building a simple box or rack might be sufficient.

An example of an environmentally sealed splice closure, incorporating organizer trays, is disclosed in EP 0159857 (Raychem). There, a base having inlet and outlet ports carries a support to which a series of organizer trays is pivotally attached. A dome-shaped cover encloses the trays and is attached to the base. Various designs of hinged organizer trays are also disclosed in U.S. Pat. Nos. 5,131,066 (Bowthorpe-Hellerman), 4,266,853 (Northern Telecom), 4,373,776 (Northern Telecom) and 4,840,449 (AT&T).

Whilst the designs disclosed in these prior art specifications are satisfactory for dealing with fibre splices, some disadvantages are apparent. For example, they are not easily able to incorporate fibre splitters without a considerable amount of work being required in the field.

SUMMARY OF THE INVENTION

We believe that an organizer system would be beneficial that could be deal in a flexible fashion with various types of splitter, particularly if the splitter and associated fibres could be pre-installed in the factory. In that way, the amount of work required in the field could be considerable reduced.

We have therefore devised organizers which can deliver incoming fibres from a single bundle, cable or set of loose tubes to a set of spaced apart organizer trays. We have also devised organizers that can be built up in modular fashion depending on the number of incoming fibres and on the splitter ratio of any splitter present. Our preferred organizers are provided with pre-determined fibre paths which can accommodate a variety of fibre configurations.

Thus, the invention provides an optical fibre organizer having a plurality of substantially mutually adjacent inlet ports and a plurality of mutually separated outlet ports, and means connecting the inlet ports and the outlet ports such that a fibre inserted into each inlet port will emerge from a pre-determined outlet port.

Whether a given port is referred to as an inlet port or an outlet port is generally arbitrary, since it may refer to the direction of the signal in the fibre to be inserted, to the direction in which the fibre is introduced or to neither.

The outlet ports are preferably substantially mutually parallel and preferably mutually separated along a direction substantially perpendicular to their direction. In this specification when we refer to directions being substantially parallel or substantially perpendicular we prefer that the deviation from exactly parallel or exactly perpendicular be less than 30°, preferably less than 20° and most preferably less than 10°.

We prefer that the outlet ports and the inlet ports be separated as indicated substantially only in a direction perpendicular to their direction. It will usually be clear precisely what part of the organizer constitutes the ports, but for the avoidance of doubt we note that by "port" we refer to an edge etc. of the organizer where the direction of the fibre ceases to be fixed. In general, the fibre will emerge or enter a hole of closed cross-section, but in some cases the fibre may be guided by some means that extends only partially around its circumference. The word "port" is intended to encompass such means, and the direction of the port is to be taken as the direction which it imparts to the fibre.

A further preferred feature of the ports is as follows. We prefer that the inlet ports be substantially mutually parallel, the outlet ports be substantially mutually parallel, and the inlet ports be substantially perpendicular to the outlet ports.

The organizer preferably has a face containing the plurality of inlet ports, and a line along which the plurality of exit ports is arranged, the face preferably lying in substantially the XY plane, the inlet ports individually or together lying substantially parallel to the Z axis, the outlet ports being separated along the Z axis and being substantially perpendicular to the X axis of a rectangular coordinate system. We refer to the inlet ports lying substantially parallel to the Z axis "individually or together" because the inlet ports need not be exactly mutually parallel; they will preferably, however, be so arranged that fibres from a single cable or single bundle be easily able to enter them possibly by continuing along the helical paths they follow in the cable or bundle.

The organizer is preferably substantially cylindrical, particularly of substantially circular cross-section, the inlet ports being at an end face, and the outlet ports being separated along the length of the cylinder. The organizer preferably has substantially helically paths running from the end face, each helical path terminating at a pre-determined position along the length of the cylinder. The paths preferably comprise, grooves in an outer surface thereof but they may comprise holes entirely within the material of the organizer or they may be formed by discrete ridges or other protrusions on an outer surface of the organizer.

A further embodiment of the invention therefore provides an organizer which comprises an elongate guiding means having a plurality of inlet ports at an end face leading to paths that advance longitudinally along and circumferentially around the means, and an elongate cover therefor that can terminate each path at such a rotational position around the means that the paths terminate at mutually separated positions along the length of the organizer. The guiding means and the cover are preferably substantially cylindrical, and the cover preferably terminates the paths at a common rotational position preferably by means of a longitudinally extending slot therein. The paths preferably advance substantially helically along the guide means and, as before, the paths preferably comprise grooves in the surface of the guide means. Fibres leaving the organizer just described preferably enter respective trays where they may be spliced to other fibres and where fibre slack may be stored. In general, the various trays will be spaced along another part of the organizer at a mutual separation corresponding to the outlet ports of the part of the organizer described above.

Since, however, this second part of the organizer may be used in the absence of the part described above, it will be initially defined independently below. The invention therefore further provides an optical fibre organizer which comprises a support for a plurality of optical fibre trays and which has guide means defining paths to be taken by fibres from one of said trays to another.

Such a support may allow an organizer to be built up in modular fashion to accommodate any number of incoming fibres being spliced to splitters of various splitter ratio. In general, an optical fibre system will incorporate a main fibre and a back-up fibre and thus incoming fibres will be provided in pairs. Each of the incoming fibres may be split into various numbers of outgoing fibres for example 4,6,8,16 or 32 depending on the amount of information carried by the incoming fibres or on the number of subscribers to be served. In order that the system be flexible and be able to accommodate various numbers of incoming and outgoing fibres, we prefer that the organizer have means for fixing the support adjacent a similar support such that a path from one support continues as a path on the other support. In particular, we prefer that each of a plurality of paths from one support continues as a respective path on the other support.

The supports themselves may have means for fixing them together or a separate device may be provided for that purpose.

A particularly advantageous design of support employs a "trunk" path that can run continuously along all of the supports to be joined together and can carry a large number of fibres. More particularly, such a trunk path preferably extends between first and second opposite edges of the support and is capable of taking a plurality of fibres across the support from another support adjacent the first edge to a further support adjacent the second edge. Fibres may be fed into the trunk path on one support and, depending on the number of such fibres, may be led from that trunk path to a plurality of "distribution" paths extending from the trunk path to an edge or edges of one or more other supports transverse to the first and second edges.

The guide means which defines the paths preferably comprises grooves in or protrusions on a surface of the support. The support preferably has means for pivotally fixing a plurality of trays thereto, such means preferably comprising a slot or hole into which a pivot pin of a tray can be snapped or slotted. The support preferably has a spring catch or other means to prevent withdrawal of the pivot pin by mere sliding thereof. The guide means may be provided at any suitable position with respect to the means for pivotally fixing the trays, but we prefer that they be provided on opposite sides of the support to one another.

In addition to one or more trays for storing fibre slack and/or fibre splices, we prefer that the organizer be provided with a fibre splitter which is also preferably mounted on a tray. In a preferred fibre system the organizer will include a fibre splitter, an input tray and an output tray. Such an organizer is preferably provided with the splitter, an incoming fibre thereto, and the requisite number of outgoing fibres therefrom, pre-installed in the factory. The incoming fibre runs from an input tray to the splitter and the outgoing fibres run from the splitter to one or more output trays. When the organizer is to be installed in the field, all that has to be done is for a fibre from a telephone central office etc. to be spliced to the fibre pre-installed on the input tray and for various fibres to subscribers etc. to be spliced to the fibres on the output tray or trays. This is clearly a much simpler field operation than installing a splitter. The fibres to an from the splitter that are pre-installed are preferably pre-installed in the paths of the guide means referred to above.

Where the first-mentioned organizer (the one with the helical or other paths) is used in conjunction with the organizer incorporating the trays, we prefer that the trays be pivotally attached to the support, and respective outlet ports of the first-mentioned organizer be positioned substantially parallel and adjacent to the pivots for the trays. This will allow the trays to be pivoted relative to the support causing deformation of fibres running from the outlet port to the trays substantially only by torsion. The trays are preferably able to be pivoted by no more than 90° since greater amounts of pivoting might result in torsional damage to the fibres.

The organizers of the invention may be environmentally sealed within a splice closure particularly one comprising a base to which the organizers are fixed and a hollow cover that abuts the base and encloses the organizers.

BRIEF DESCRIPTION OF THE DRAWINGS

The invention is further illustrated by the accompanying drawings, in which:

FIG. 1 shows a prior art optical fibre splice closure;

FIG. 5 shows part of an optical fibre architecture showing splitters;

DESCRIPTION OF THE PREFERRED EMBODIMENTS

Figure 2:
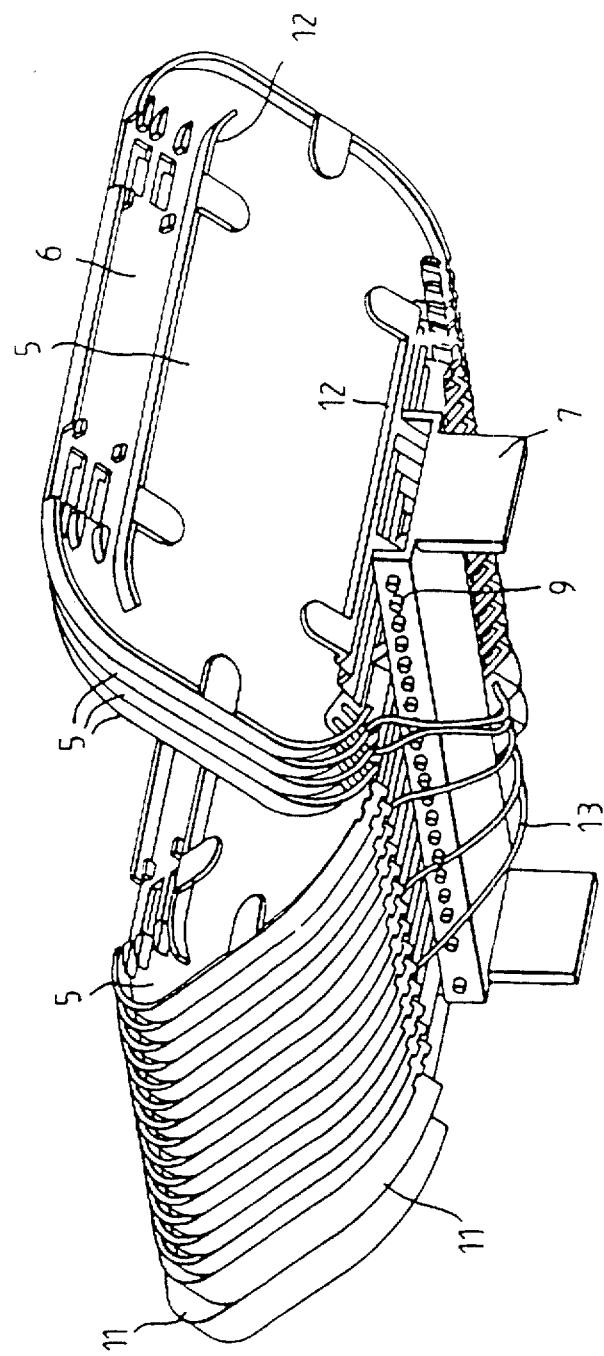
FIG. 2 is a perspective view of an organizer of the invention.

FIG. 1 shows an optical fibre organizer as disclosed in EP 0159857 (Raychem). A base plate 1 and a dome-shaped cover 2 together form an enclosure for use as a butt splice case for optical fibre cables. The base 1 is preferably manufactured by moulding from a glass-filled high density polyethylene or polypropylene. Outlets 3 are provided in the base through which the cables pass. On a new installation, some only of the cables 3 may be required and some may therefore be temporarily blocked as shown at 4. Such blocking may be by any suitable means, but we prefer that the outlet be made with closed ends which are simply cut off as required. The dome-shaped cover may be blow moulded and may incorporate a moisture vapour barrier such as a metal foil.

The hollow article contains an optical fibre organizer which comprises a series of trays 5. Each tray preferably includes means 6 for accommodating splice tubes which house the fibre splices. The trays are preferably held on a support 7 which is fixed to the base 1. The trays are shown pivotally fixed along their short edges, but other hinging for example pivoting for rotation eg about one corner in the plane of the trays could be provided. The hinging allows chosen trays to be exposed for installation of the splices or for repair etc. Means is preferably also provided for locking the trays in their hinged position.

The assembly may be used as follows. Firstly pass the two cables to be spliced in the direction of the arrows through two of the outlets 3 such that, say, 1.5 metres of each cable protrudes into the splice closure. The cable jackets are then removed back to the base 1 to expose 1.5 metres of fibres. The strength core of each cable is then cut back, leaving enough remaining for it to be fastened into respective fastening holes 8. Each fibre of one cable is then spliced to the correct fibre of the other cable. Groups of say 10 or 12 spliced fibres are then stored on each tray. When one tray is filled it is moved by pivoting at 9 to expose another tray. Each tray preferably has a rim 10 to ensure a sufficient separation between adjacent trays and/or to prevent fibre slippage from each tray.

The remaining figures illustrate various aspects of the invention many of which can be used independently of the others. These features can in general be used in conjunction with the splice closure illustrated in FIG. 1.

FIG. 2 illustrates an optical fibre organizer which comprises a support for a plurality of optical fibre trays and which has guide means defining paths to be taken by fibres from one of said trays to another. A series of trays 5, which may incorporate means 6 for housing a fibre splice, are mounted on a support 7 by means for example of a pivot 9. Also mounted on the support 7 may be one or more splitter housings 11. Each splitter housing may be sealed by means for example of a lid since fibres to and from the splitter may be pre-installed in the factory, and access to the splitter need not be required for installation of the organizer in the field. Fibres 13 can be seen leaving various trays and passing underneath the support 7 where their paths are determined by guide means on the lower surface of the support 7. The fibres then pass to other trays or to a splitter. Item 13 may represent a tube carrying a fibre or, where it is desirable that more than one fibre run from one tray to another, item 13 may represent a tube carrying several fibres.

Figure 3A:
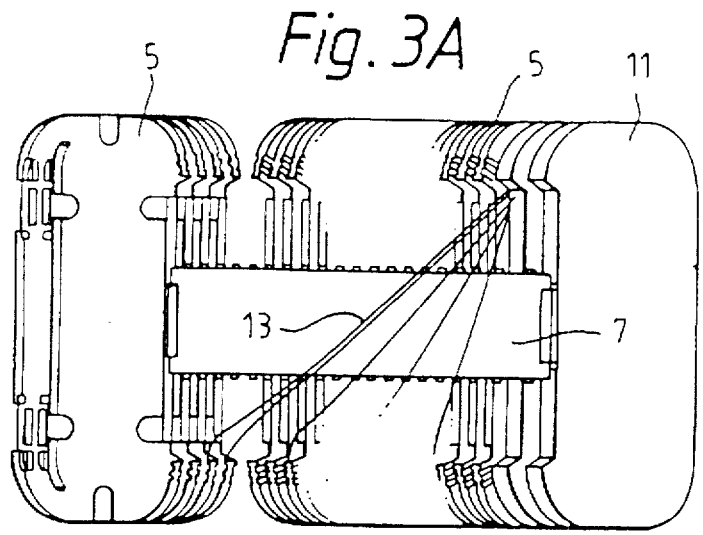
FIGS. 3A–3C show various other views of the organizer of FIG. 2.
Figure 3B:
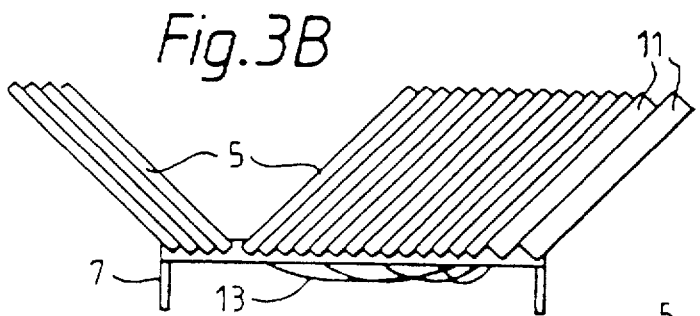
Figure 3C:
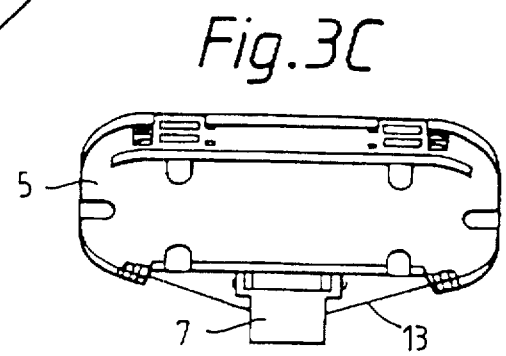
Figure 4A:
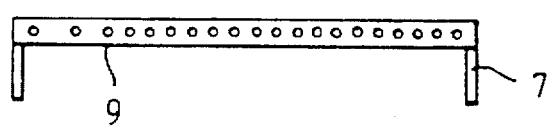
FIGS. 4A–4D show various views of a support for an organizer of FIGS. 2 and 3.
Figure 4C:
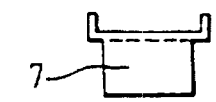
Figure 4B:
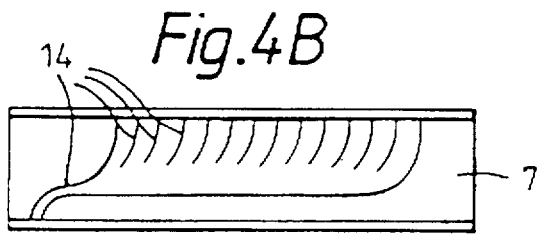
Figure 4D:
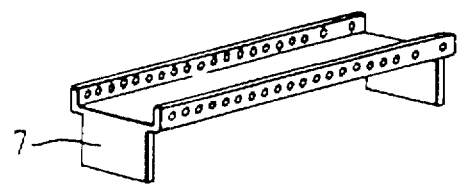

FIG. 3A shows the organizer of FIG. 2, viewed from below. The fibres 13 can be seen to cross support 7, and are guided in their paths across the support by means of grooves or other guide means. FIG. 3B is a side elevation of the same organizer, where the ability of the trays 5 to be pivoted can be clearly seen. FIG. 3C is an end elevation showing one tray 5 mounted on the support 7.

The support 7 is more clearly illustrated in FIGS. 4A, 4B, 4C and 4D, which show various views. Grooves 14 in the support 7 can be seen in FIG. 4D. These grooves should, of course, follow a radius of curvature of at least the critical bend radius of the fibres, typically about 30 mm. The overall size of the organizer, and therefore the support 7 will depend on its particular use. We prefer, however, that its length be from 100 to 200, preferably 100 to 170 mm and its width be from 20 to 50, preferably from 25 to 35 mm.

A preferred fibre architecture or routing is showed in FIG. 5. Here, fibres from a central office or elsewhere are split in order to serve the requisite number of subscribers. In order to ensure continuity of service, back-up fibres are provided in addition to the main fibres. The splitter illustrated is a so-called 2:16 splitter, which means that the pair of fibres from each of the main and back-up sources are split into 16 fibres. An incoming fibre from a central office or elsewhere enters the organizer and is spliced to a pre-installed fibre on an input tray, preferably a single circuit input tray. The pre-installed fibre runs from that input tray to a splitter, preferably mounted on another tray or other splitter housing. Fibres are also pre-installed from the splitter output to one or more output trays, preferably single circuit output trays. Outgoing fibres will therefore be spliced to the pre-installed fibres in those output trays. FIG. 5 shows main and back-up single circuit input trays at the left of the figure, two splitters at the centre of the figure, and four of the sixteen single circuit output trays at the right of the figure. Thus, the routing of FIG. 5 will in general be pre-installed in the factory.

Figure 6A:
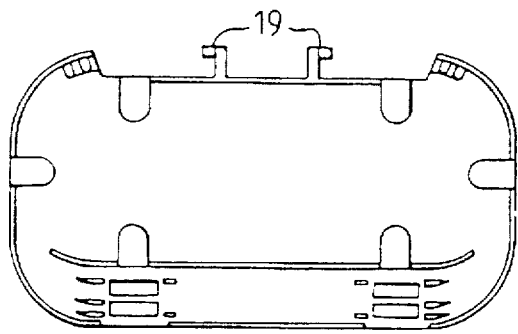
FIGS. 6A and 6B show a single circuit tray.
Figure 6B:
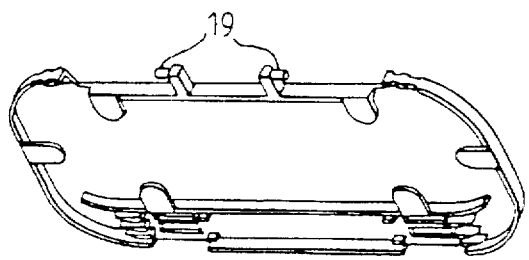

FIGS. 6A and 6B show two views of a single circuit input or output tray. The tray may be mounted in a support by means of the pivot pins 19.

Figure 7A:
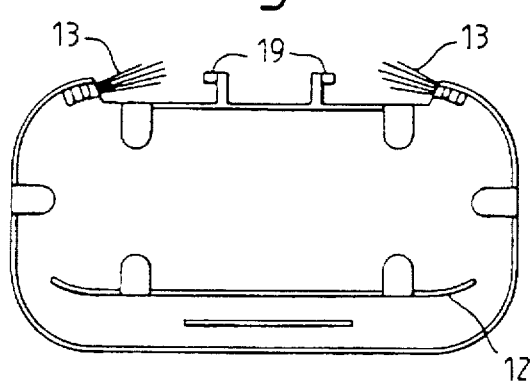
FIGS. 7A and 7B show a single module tray.
Figure 7B:
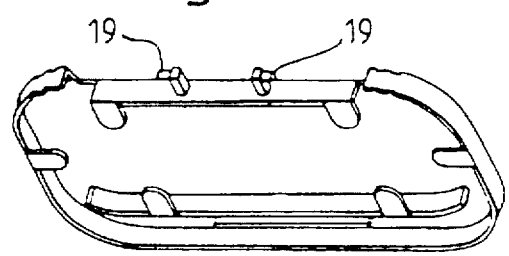

FIGS. 7A and 7B show two views of a single module tray, a plurality of fibres 13 being seen to enter and leave the tray. A module tray, rather than a single circuit tray, may be used when several fibres, for example from a single fibre tube, are to be organized and/or spliced on one tray. A second use for a module tray is for reorganization of several fibres after splitting and initial routing to separate trays. It might be desirable to regroup a series of fibres into a single cable and a module tray may be used for that purpose. A module tray will in general be thicker than a single fibre tray.

Figure 8:
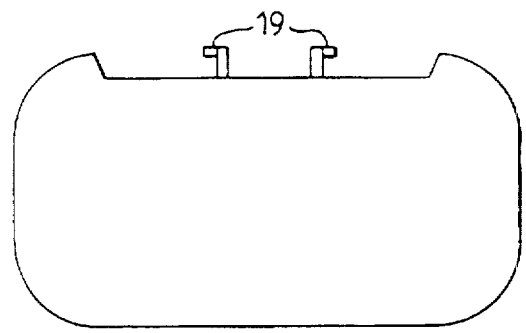
FIG. 8 shows a splitter housing.

FIG. 8 shows a splitter housing in tray form.

The size of the trays will of course depend on the particular use of the organizer, but the following dimensions are at present preferred. The trays are preferably substantially elliptical in shape so that they can lie obliquely in an enclosure of substantially circular cross-section. The width of the trays (the maximum horizontal dimension as drawn in FIGS. 6, 7 and 8) is preferably from 150 to 200 mm and the depth (vertical direction as drawn) is preferably from 80 to 110 mm.

Figure 9:
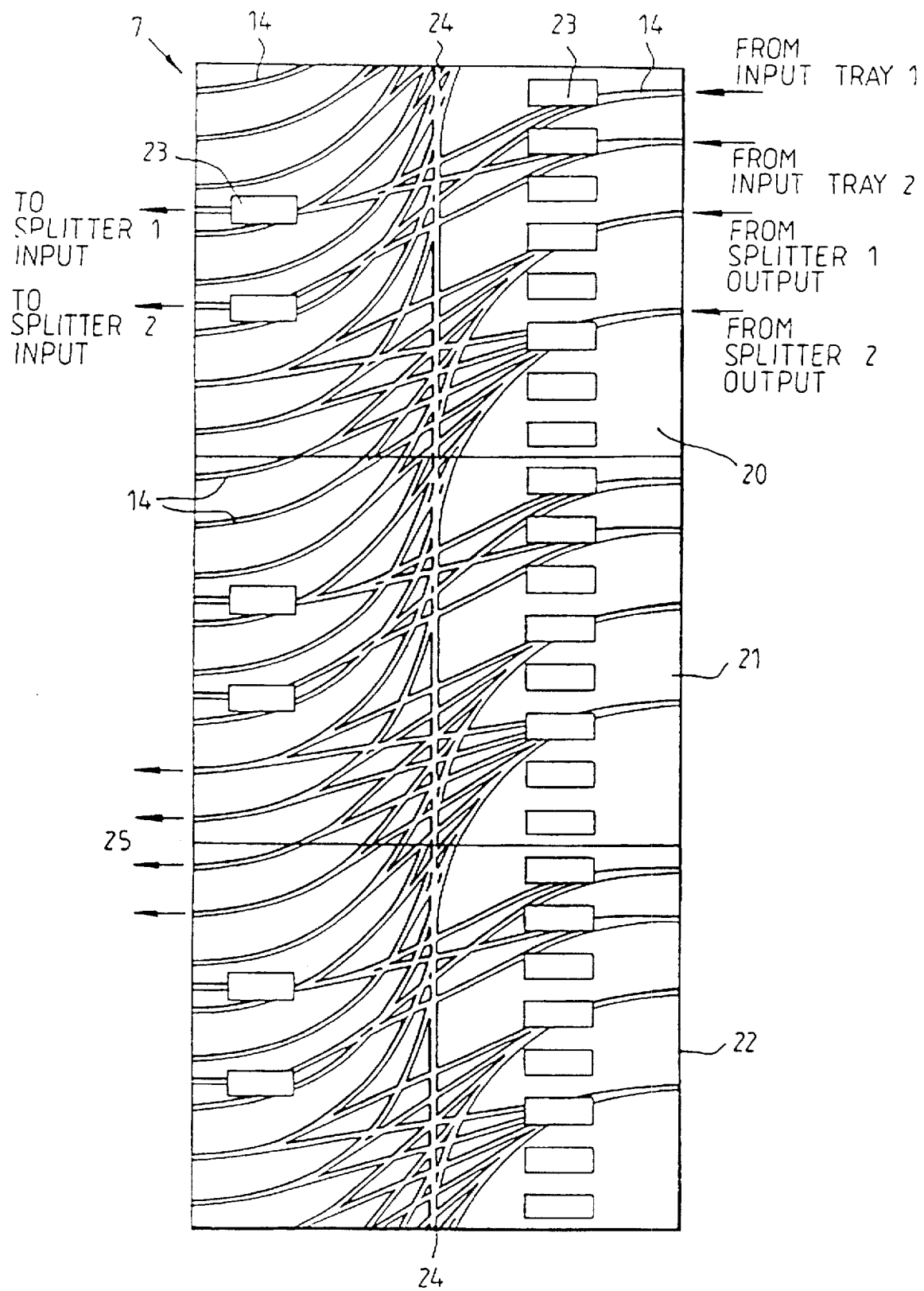
FIG. 9 shows a fibre routing system.

A tray support of modular construction is shown in FIG. 9. Three modules 20, 21 and 22 are shown but more or fewer may be used as desired. Each support module is shown having grooves in its surface, or other guide means, defining paths to be taken by fibres from one tray mounted on the support to another. Catches 23 are also shown whose function is to retain trays in their correct position on the support; they will be more fully explained in connection with FIG. 10 below. The paths 14 of FIG. 9 allow fibres to be routed as follows. A fibre from an input tray mounted on one of the modules of the support 7 enters one of the paths 14 from the right-hand side as drawn, for example the top path 14 labelled "from input tray 1". The fibre traverses the support 7 and leaves the left-hand side at the path marked "to splitter 1 input". Splitter 1 will in general also be mounted on the support 7, and a series of fibres leaving that splitter will also traverse the support 7, entering it at the right-hand side at the position market "from splitter 1 output". The number of fibres entering the right-hand side of the support at that position will depend, of course, on the splitter ratio.

The modular nature of the support 7 can be seen to allow various numbers of splitters and splitters of various splitter ratio. This can be seen by observing the number of paths that branch from, for example, the path labelled "from splitter 1 output". Some of those paths traverse the support 7 directly, and some merge with a so-called "trunk" path extending between first (upper as drawn) and second (lower as drawn) opposite edges of the support. The resulting trunk path is capable of taking a plurality of fibres across the support from another support adjacent the first edge to a further support adjacent the second edge. Thus, by adding more supports a sufficient number of paths can be generated from the right-hand side of the support from the splitter output to the left-hand side which provides inputs to the final single circuit output trays, some of which inputs are labelled as 25.

Figure 10:
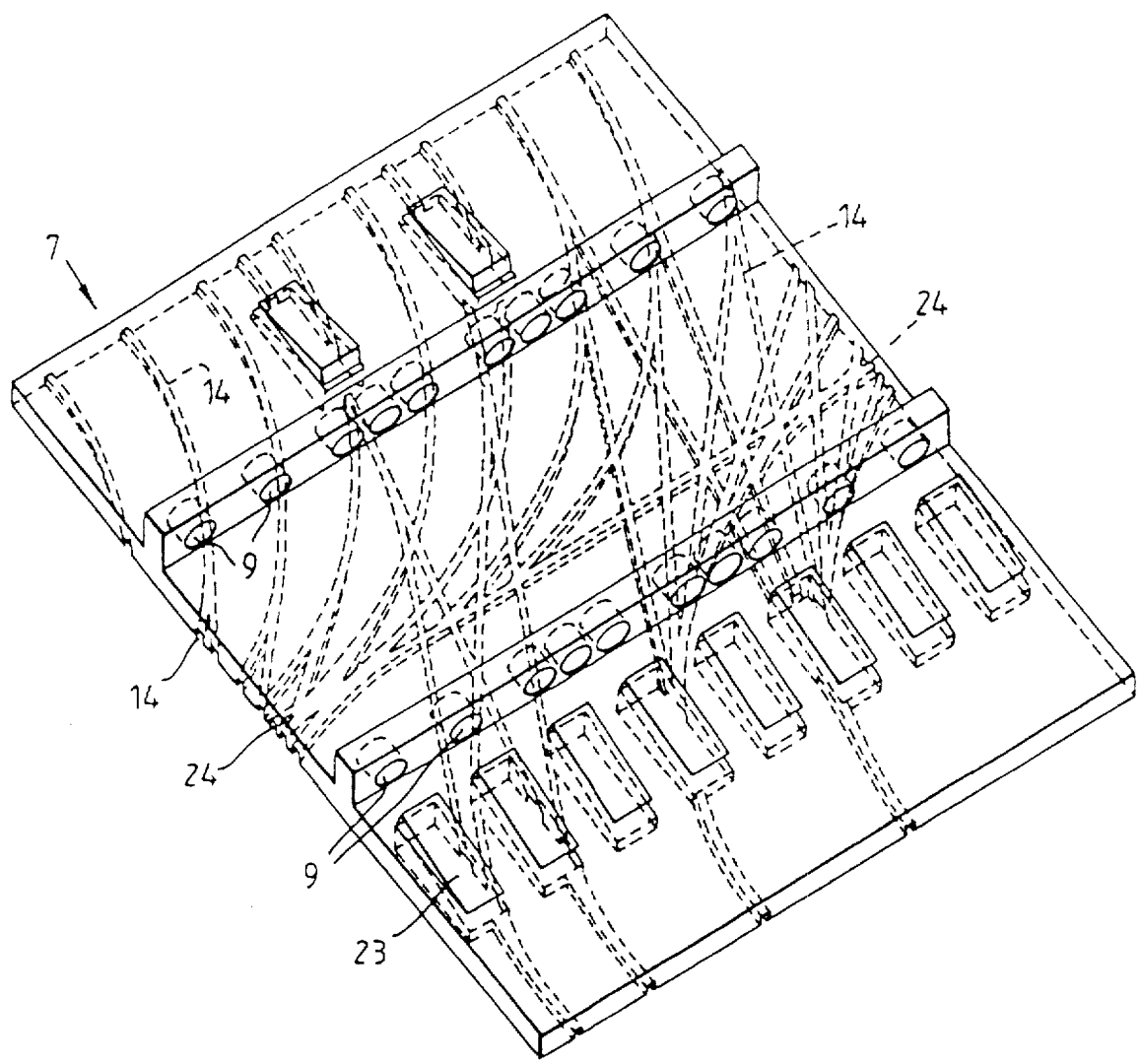
FIG. 10 shows a modified fibre routing system.

A perspective view of a similar support is shown in FIG. 10. Here, the paths comprise grooves in a lower surface of the support, and the upper surface carries ridges having pivot holes 9 therein in which the trays will be mounted. Pivot pins of the trays may be slid into these holes 9 causing spring catches 23 to be depressed as the sliding is carried out. When the trays are fully in position the spring catches can return to their raised position thus trapping the trays in place.

Figure 11:
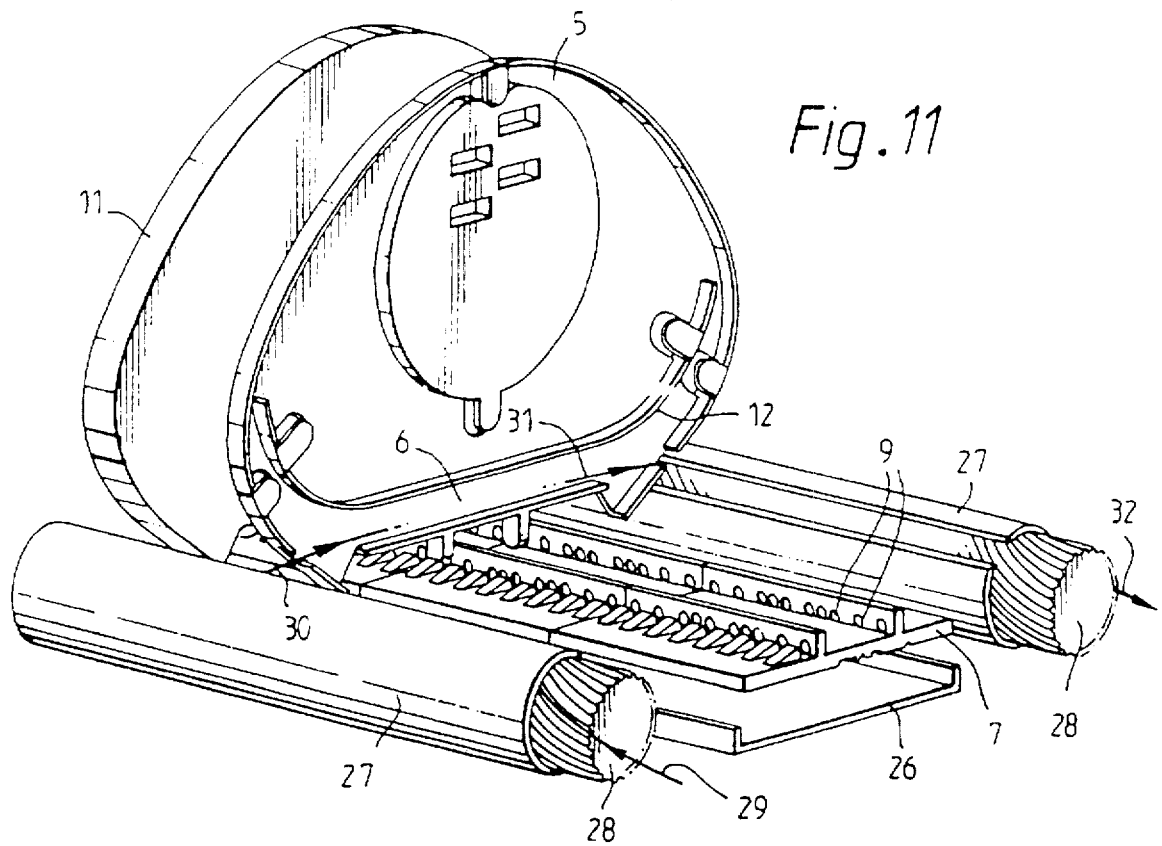
FIG. 11 shows an optical fibre organizer including trays and inlet and outlet fibre guiding means.

The organizer of FIG. 11 incorporates the support 7 of FIGS. 9 and 10 and also includes a further support part 26 and inlet and outlet organizers 27.

Organizers 27 have a plurality of substantially mutually adjacent inlet ports, preferably arranged circumferentially around end faces 28, and a plurality of mutually separated outlet ports, preferably distributed along the length of the organizers 27, and means connecting the inlet ports and the outlet ports such that a fibre inserted into each inlet port will emerge from a pre-determined outlet port. This is illustrated in more detail in FIG. 12.

Figure 12:
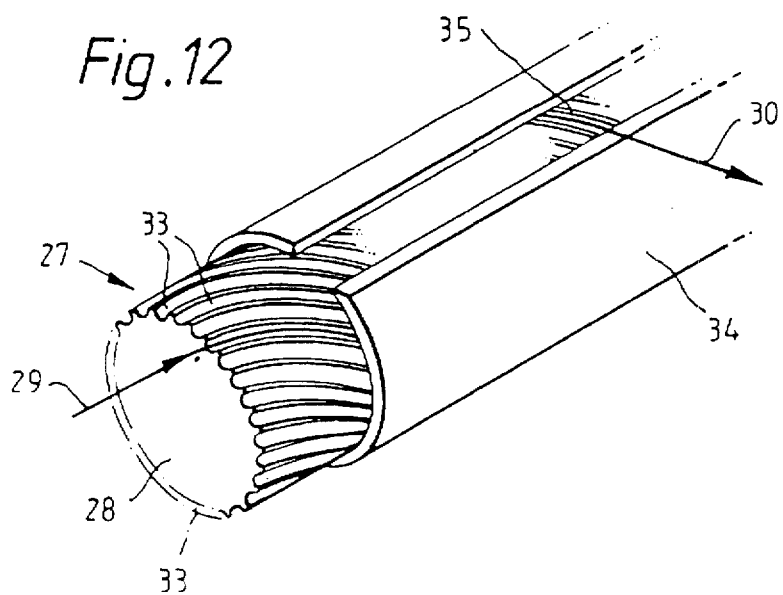
FIG. 12 shows fibre guiding means as used in FIG. 11.

In FIGS. 11 and 12 an incoming fibre is shown entering the end face 28 of one of the organizers 27.

The organizer preferably comprises an elongate guiding means having a plurality of inlet ports at an end face 28 leading to paths 33 that advance longitudinally along and circumferentially around the means (preferably in substantially helical fashion), and an elongate cover 34 therefor that can terminate each path 33 at such a rotational position around the means that the paths terminate at mutually separated positions along the length of the organizer. Thus, fibre 29 entering at one particular inlet port can be seen to emerge as fibre 30 at a particular position along the length of the organizer. Fibre 30 then enters tray 5 where it is spliced to a pre-installed fibre that extends to that tray from one of the paths of support 7 illustrated in FIGS. 9 and 10. Fibre 31 can be seen to leave a tray and enter the right-hand organizer of FIG. 11 and finally leave end face 28 as fibre 32.

The organizer 27 is preferably constructed such that a fibre can be pushed by hand, or otherwise advanced, into its inlets and emerge undamaged at its outlets. Thus, the path from inlet to outlet is preferably smooth and has a minimum radius of curvature no smaller than the minimum bend radius of the fibre. The radius of the path will be determined at least by the diameter of the guiding means and the pitch of the helix or other curve. A pitch of, say, at least 4 mm, preferably 5–8 mm will generally be suitable since that allows a suitable tray separation. From those figures, suitable diameters of the guiding means can be calculated given the minimum bend radius of the fibre, say 25 or 30 mm.

Figure 13A:
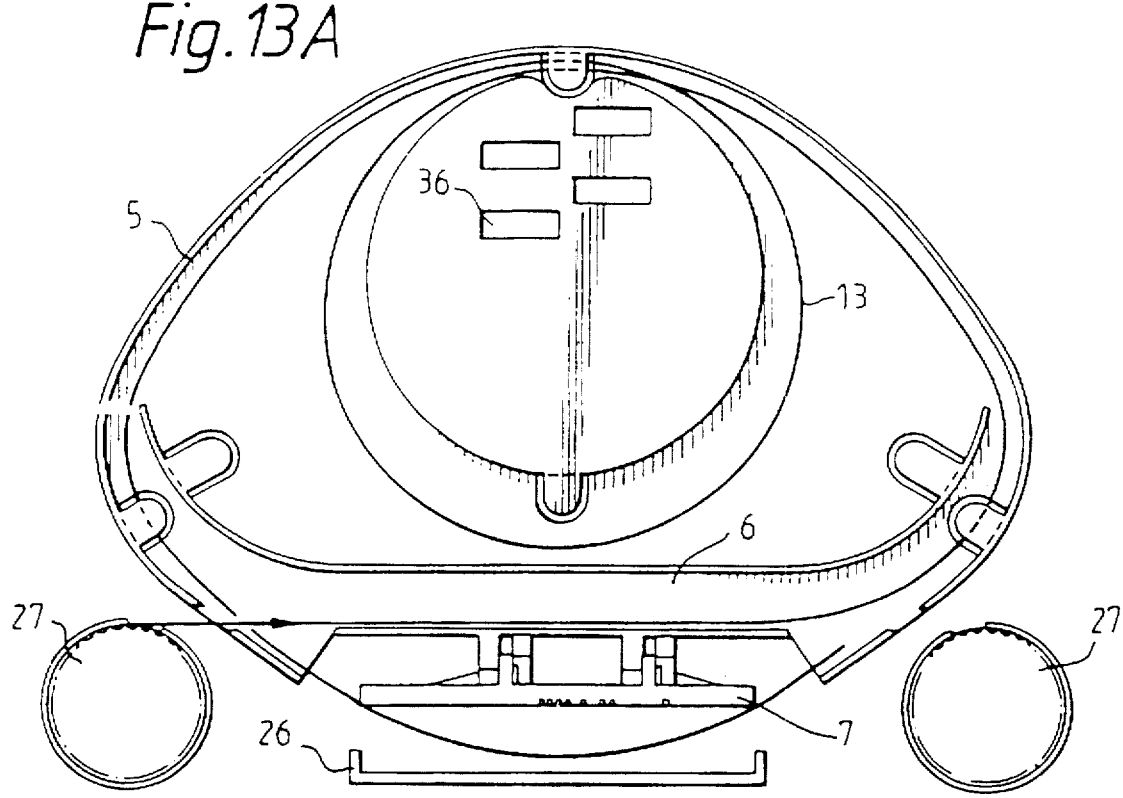
FIGS. 13A and 13B show tray designs.
Figure 13B:
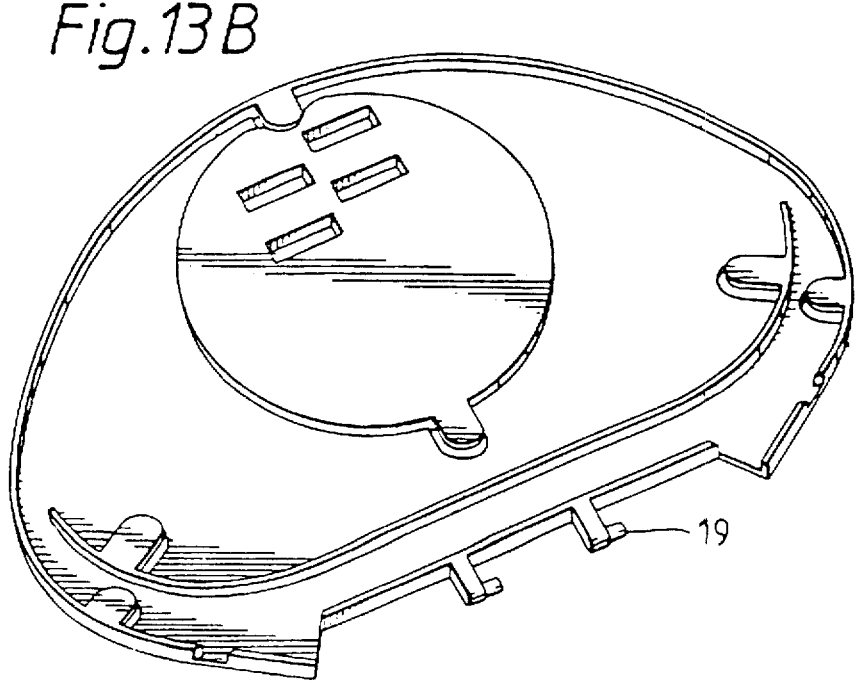

An end view of the combined organizers is shown in FIG. 13A and a perspective view of the tray of FIG. 13A is shown in FIG. 13B. For clarity a fibre is shown in FIG. 13A traversing the support 7 slightly separated from the support but in practice it would be obscured in a groove therein. Tray 5 of FIG. 13A can be seen to include various clip-on windows 36.

For the avoidance of doubt, it is noted that the invention provides various organizers, tray designs, splitter configurations, fibre routing patterns pre-installations of fibre, and architectures each of which may be used independently of the others.

We claim:

1. An optical fibre organizer which comprises:
   (a) a support for a plurality of optical fibre trays;
   (b) an input tray and an output tray mounted in series on a surface of the support;
   (c) a splitter tray also mounted in series on the surface of said support, the splitter tray including an optical fibre splitter; and
   (d) guide means for defining predetermined guiding paths to be taken by optical fibres and for guiding optical fibres from the splitter tray to the input and output trays, the guide means being provided on an opposite surface of the support to that on which the trays are mounted.

2. An organizer according to claim 1, having means for fixing the support adjacent a another support such that a path from one support continues as a path on the other support.

3. An organizer according to claim 2, in which each of a plurality of paths from one support continues as a respective path on the other support.

4. An organizer according to claim 2, in which the support has a trunk path extending between first and second opposite edges of the support and being capable of taking a plurality of optical fibres across the support from another support adjacent the first edge to a further support adjacent the second edge.

5. An organizer according to claim 4, in which the support has a plurality of distribution paths extending from the trunk path to an edge or edges of the support transverse to the first and second edges.

6. An organizer according to claim 1, in which the guide means comprises grooves in or projections on said opposite surface of the support.

7. An organizer according to claim 1, in which lengths of optical fibre are pre-installed from the input tray to the splitter and from the splitter to the output tray via said paths.

8. An organizer according to claim 1, having at least two output trays for receiving respective fibres from the splitter.

9. An organizer according to claim 1, which is environmentally sealed within a splice closure.

10. An organizer according to claim 1, in which said trays are pivotally mounted on the support.

11. An organizer according to claim 10, in which said trays are pivotally mounted on the support by means of slots or holes into each of which a pivot pin of a tray can be snapped or slotted.

12. An organizer according to claim 11, in which the support has a resilient catch to prevent withdrawal of a said pivot pin by mere sliding thereof.

13. An organizer according to claim 1, in which the support allows the organizer to be built up in modular fashion to accommodate any number of lengths of optical fibre spliced to one or more said splitters.

14. An organizer according to claim 1, in which there is a plurality of said supports, the supports having means for fixing them together.

15. An organizer according to claim 1, in which there is a plurality of said supports, the organizer further comprising a separate device for fixing the supports together.

* * * * *